Patented Nov. 9, 1943

2,333,804

UNITED STATES PATENT OFFICE 2,333,804

PROCESS FOR PREPARING POLYVINYL ACETAL RESINS

Carl J. Malm and Martti Salo, Rochester, N. Y., assignors to Eastman Kodak Company, Rochester, N. Y., a corporation of New Jersey No Drawing. Application June 8, 1940, Serial No. 339,529

2 Claims. (Cl. 260—73)

This invention relates to a process for preparing resins and more particularly to a process for preparing polyvinyl acetal resins.

It is known that polyvinyl acetal resins can be prepared by concomitantly deesterifying polyvinyl esters and condensing the deesterified product with aldehydes, in the presence of a catalyst. It is further known that polyvinyl esters can be first partially deesterified and that the partially deesterified ester can then be further deesterified and concomitantly condensed with aldehydes in the presence of a catalyst to give polyvinyl acetal resins. It is in this latter general type of process that our improvements have been made.

In either of the aforesaid general types of processes, deesterification has been accomplished in alcoholic and in organic acid media. Our improvements relate to deesterification in organic acid media.

In the preparation of polyvinyl acetal resins from polyvinyl esters by any process, the problem is to produce resins low in hydroxyl and ester group content, which are as free from colored, as well as uncolored, side reaction products as possible. To attain this end, it has been proposed to react polyvinyl esters and aldehydes in the presence of alcohols at temperatures of about 40° C. in the presence of small amounts of acid catalysts. Such processes, while fairly satisfactory for certain aldehydes, are quite unsatisfactory for a number, e. g., formaldehyde. Formaldehyde and certain other aldehydes react so slowly under such conditions that it is actually impossible to obtain resins low in hydroxyl group content. A process which is more generally applicable to aldehydes comprises reacting polyvinyl esters and aldehydes in the presence of aqueous acetic acid and a catalyst at about 50° C. Such processes have the disadvantage of requiring a very long time for completion (i. e., to attain low ester group content)—at best around eight days, unless a large amount of catalyst is employed. The resins obtained by such processes, while of good quality, suffer from having remained in contact with the catalyst acid for so long a time, whereby side reactions can take place to a greater or lesser extent. It is to improvement of such organic acid processes that our efforts have been directed.

We set out to shorten the reaction time of the so-called organic acid processes without increasing temperature or concentration of catalyst; an increase of either of which in the previously known processes has resulted in undesirable products. The problem was complicated by the fact that in large scale production of polyvinyl acetal resins, it is essential to have homogeneous reaction mixtures in order that a minimum of agitation of the reactants during the process is required.

It is accordingly an object of our invention to provide an improved process for the preparation of polyvinyl acetal resins. It is a further object of our invention to produce high quality resins as free from side reaction products as possible and in the shortest time possible. Other and more specific objects will appear hereinafter.

According to our process, we hydrolyze, in the presence of a catalyst, a polyvinyl ester dissolved in a reaction mixture comprising water and an organic acid which is miscible in all proportions with water at about 20° C. During the hydrolysis (deesterification) of the polyvinyl ester, we add water to the reaction mixture. The amount of water added and the rate at which it is added are limited only by the tendency of polyvinyl ester, partially deesterified or otherwise, to precipitate or separate from the reaction mixture. It is advantageous to avoid any precipitation of polyvinyl ester, partially deesterified or otherwise. After the polyvinyl ester is appreciably hydrolyzed, we add aldehyde to the reaction mixture and increase the amount of organic acid in the reaction mixture at a rate which substantially precludes precipitation of any polyvinyl acetal resin. Advantageously, organic acid is added to the reaction mixture very rapidly, either before or simultaneously with the addition of the aldehyde.

While, according to our process, the aldehyde can be added to the reaction mixture at any time after the polyvinyl ester has been hydrolyzed to an appreciable extent, e. g., after the polyvinyl ester has been hydrolyzed to the extent of 5% or 10%, it is advantageous to carry out the hydrolysis to a much greater extent before adding the aldehyde. Most advantageously, the polyvinyl ester is hydrolyzed at least to the point where it is water-soluble before adding any aldehyde.

While our improved process is subject to variation, the following example will serve to illustrate the manner of practicing our invention. These examples are not intended to limit the scope of our invention. In the following examples, the viscosity of the polyvinyl ester stated is that of its molar solution (86.05 g. per liter, in the case of polyvinyl acetate) in benzene at about 20° C.

Example 1

100 parts of polyvinyl acetate (viscosity 25) were dissolved in 150 parts of glacial acetic acid and 100 parts of water. 10 parts of sulfuric acid (sp. g. 1.84) were added. The resulting mixture was heated at 75° C. with agitation. 220 parts of water were added to the reaction mixture gradually over a period of about eight hours while maintaining the temperature at about 75° C. At the end of this time, the mixture was agitated and heated at 75° C. for a further 12 hours. At the end of this time the hydrolysis product had become water soluble, as evidenced by the fact that a test portion of the reaction mixture was completely miscible with three times its own volume of water. The temperature of the reaction mixture was lowered to about 40° C. 330 parts of glacial acetic acid and 50 parts of paraldehyde were added to the reaction mixture with stirring, in order to insure complete mixing. The resulting mixture was allowed to stand about five days. At the end of this time, the reaction mixture was poured slowly into water to precipitate the resin. The precipitated resin was thoroughly washed with water and then dried. The resin contained an acetate group content equivalent to about 10.2% by weight of polyvinyl acetate and a hydroxyl group content equivalent to about 8.0% by weight of polyvinyl alcohol. The resin was pure white in color.

Example 2

100 parts of polyvinyl acetate (viscosity 25) were dissolved in 150 parts of glacial acetic acid and 100 parts of water. 10 parts of sulfuric acid (sp. g. 1.84) were added. The resulting mixture was heated at 75° C. with agitation. 220 parts of water were added to the reaction mixture gradually over a period of about eight hours while maintaining the temperature at about 75° C. At the end of this time, the mixture was agitated and heated at 75° C. for a further 12 hours. At the end of this time the hydrolysis product had become water soluble, as evidenced by the fact that a test portion of the reaction mixture was completely miscible with three times its own volume of water. The temperature of the reaction mixture was lowered to about 40° C. 100 parts of a 50% (by weight) solution of acetaldehyde in glacial acetic acid were added to the reaction mixture with stirring. 280 parts of glacial acetic acid were also added to the reaction mixture. The resulting mixture was allowed to stand at about 40° C for about 5 days. At the end of this time, the reaction mixture was poured slowly into water to precipitate the resin. The precipitated resin was thoroughly washed with water and then dried. The resin contained an acetate group content equivalent to about 10% by weight of polyvinyl acetate and a hydroxyl group content equivalent to about 8% by weight of polyvinyl alcohol. The resin was pure white in color.

In practicing our invention, any polyvinyl ester can be employed. Advantageously, a polyvinyl aliphatic organic ester is employed. Most advantageously, polyvinyl acetate is used as a starting material. Polyvinyl acetate is also probably the cheapest and most readily available polyvinyl ester. Polyvinyl acetate-propionate, polyvinyl chloracetate, polyvinyl butyrate and polyvinyl oleate-acetate are examples of other polyvinyl esters which are easily adapted to our new process. Polyvinyl esters of all viscosities can be employed. Polyvinyl acetate of viscosities 15 to 60 are advantageously employed.

The organic acid employed in the reaction mixture should be miscible in all proportions with water at about 20° C. Acetic acid is advantageously employed, although mono-chloracetic acid, formic acid and propionic acid are easily adapted to our process.

Advantageously, the ratio of organic acid to water in the reaction mixture at the beginning of the hydrolysis of the polyvinyl ester is such that the weight of the organic acid is more than the weight of the water. Most advantageously, at the start of the hydrolysis, the weight of the organic acid constitutes from about 60 to about 80% of the total weight of the organic acid and water.

The ratio, by parts by weight, of aqueous organic acid (organic acid plus water) to polyvinyl ester in the reaction mixture at the beginning of the hydrolysis is advantageously within the range about 6:1 to about 10:1, although ratios outside this preferred range can be employed.

During the initial hydrolysis, water is advantageously added to the reaction mixture gradually over a period of hours. The water is advantageously added in small enough portions and over a sufficient period of time that precipitation of polyvinyl ester is avoided. Sufficient water is advantageously added during the hydrolysis to reduce the ratio of organic acid to water in the reaction mixture to the point where the organic acid constitutes from but about 30 to about 40% of the total weight of organic acid and water, including the organic acid generated by hydrolysis of the polyvinyl ester.

The temperature employed during the initial hydrolysis is advantageously at least about 70° C., a temperature within the range from about 70° C. to about 100° C. being preferable. Upon addition of the aldehyde, the temperature is advantageously reduced to at least about 50° C., a temperature within the range from about 20° C. to about 50° C. being preferable. A temperature of about 40° C. is the most advantageous temperature to employ during the aldehyde reaction.

Catalysts for reactions of this type are very well known in the art. It is most advantageous to employ an acid catalyst, particularly mineral acid catalysts, such as hydrochloric or sulfuric acid for example, in our new process. Acid catalysts, particularly those mineral acid catalysts given above, accelerate the initial hydrolysis very well and also accelerate the subsequent concomitant hydrolysis and acetal condensation very well. Other catalysts which can be employed are for example trichloracetic acid, organic sulfonic acids and zinc chloride. Zinc chloride accelerates acetal condensations much better than it accelerates hydrolysis in our new process and should not be employed alone to accelerate the initial hydrolysis.

The concentration of catalyst employed will vary according to its nature and the nature of the polyvinyl ester and aldehyde employed. Generally larger concentrations of catalyst accelerate our new process, particularly the initial hydrolysis, more rapidly. However, larger concentrations of catalyst are advantageously avoided. When carrying out our process with temperatures of 70° to 100° C. for the initial hydrolysis and temperatures of 20° to 50° C. for the subsequent concomitant further hydrolysis and acetal condensation only very small amounts of catalyst are necessary. The weight of acid catalyst necessary under such conditions is equal to from 5 to 15% of the weight of starting polyvinyl ester.

What we claim as our invention and desire to be secured by Letters Patent of the United States is:

1. A process for preparing a pure white polyvinyl acetal resin comprising hydrolyzing, at a temperature of from about 75° to about 100° C., a polyvinyl acetate dissolved in from about six to about ten times its weight of a mixture of from about 60% to about 80% aqueous acetic acid, in the presence of an amount of an acid catalyst equal to from about 5 to about 15% by weight of the polyvinyl acetate, gradually increasing the weight of water during hydrolysis while maintaining the temperature at from about 75° to about 100° C., until the concentration of the aqueous acetic acid is decreased to from about 30% to about 40%, and after the polyvinyl acetate is hydrolyzed to the point where it is water-soluble, changing the temperature to from about 20° to about 50° C., adding aldehyde and increasing the weight of acetic acid at a rate which substantially precludes precipitation of any polyvinyl acetal resin.

2. A process for preparing a pure white polyvinyl acetal resin comprising hydrolyzing, at a temperature of from about 75° C. to about 100° C., a polyvinyl acetate dissolved in from about six to about ten times its weight of a mixture of from about 60% to about 80% aqueous acetic acid, in the presence of an amount of acid catalyst equal to from about 5 to about 15% by weight of the polyvinyl acetate, gradually increasing the weight of water during hydrolysis while maintaining the temperature at from about 75° to about 100° C., until the concentration of the aqueous acetic acid is decreased to from about 30% to about 40%, and after the polyvinyl acetate is hydrolyzed to the point where it is water-soluble, changing the temperature to from about 20° to about 50° C., adding acetaldehyde and increasing the weight of acetic acid at a rate which substantially precludes precipitation of any polyvinyl acetal resin.

CARL J. MALM.
MARTTI SALO.